(12) United States Patent
Thelusma

(10) Patent No.: US 10,847,993 B2
(45) Date of Patent: Nov. 24, 2020

(54) PORTABLE CHARGING DEVICE BUILT INTO A WATCH AND WATCH BAND

(71) Applicant: Jovans R. Thelusma, Jonesboro, GA (US)

(72) Inventor: Jovans R. Thelusma, Jonesboro, GA (US)

( * ) Notice: Subject to any disclaimer, the term of this patent is extended or adjusted under 35 U.S.C. 154(b) by 56 days.

(21) Appl. No.: 16/278,131

(22) Filed: Feb. 17, 2019

(65) Prior Publication Data
US 2020/0266655 A1 Aug. 20, 2020

(51) Int. Cl.
*G04C 10/02* (2006.01)
*H02J 7/35* (2006.01)

(52) U.S. Cl.
CPC ................ *H02J 7/35* (2013.01); *G04C 10/02* (2013.01)

(58) Field of Classification Search
CPC ...................................................... G04C 10/02
See application file for complete search history.

(56) References Cited

U.S. PATENT DOCUMENTS

| | | | | |
|---|---|---|---|---|
| 2012/0293107 A1* | 11/2012 | Ajagbe | ................. | H04M 19/08 320/101 |
| 2014/0375246 A1* | 12/2014 | Boysen, III | ............. | H02J 7/342 320/101 |
| 2018/0129249 A1* | 5/2018 | Ko | .......................... | H02S 99/00 |
| 2018/0316783 A1* | 11/2018 | Ye | ....................... | H04M 1/0245 |

FOREIGN PATENT DOCUMENTS

| | | | | |
|---|---|---|---|---|
| JP | 08211166 A | * | 8/1996 | |
| WO | WO-2018187995 A1 | * | 10/2018 | ............. G04G 19/10 |

OTHER PUBLICATIONS

Bridgette Meinhold, "Wearable Solar-Powered Leaf Phone Charges on the Go;" https://inhabitat.com/wearable-solar-powered-leaf-phone-charges-on-the-go/accessed on Jun. 18, 2020; published Aug. 12, 2009. (Year: 2009).*

* cited by examiner

*Primary Examiner* — Daniel J Colilla

(57) ABSTRACT

A portable charging device is built into a watch and watch band. A foldable flexible solar panel array is stored under the watch band in a thin flat condition allowing the user to wear the solar panel and watch band together. The charging electronics and rechargeable battery are located within the watch housing under a standard watch assembly. A charging cable can be extended from the side of the watch housing and can be plugged into a smart phone or other electronic device for the purpose of recharging. The solar panel array can be folded out in a lit environment to recharge the battery located within the watch housing. In this way, a person can recharge their phone or other electronic device while on the go by plugging it into the wearable watch and watch band.

4 Claims, 6 Drawing Sheets

PORTABLE CHARGING DEVICE BUILT INTO A WATCH AND WATCH BAND

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of wrist watches and electronic charging devices and more specifically to a portable charging device built into watch housing and watch band.

Wrist watches are well known as being portable time pieces attached to a person's wrist by a wrist band. They are commonly worn daily by men and women around the world. Many small electronic devices including smart phones are also carried and used by millions of people around the world. The batteries of smart phones and other electronic devices need regular recharging.

To facilitate charging, there are many battery chargers on the market including portable chargers that include an internal battery that can be recharged via 120 volts AC or even by solar panels. The battery in the charger supplies its energy to the battery inside the phone or other device so that it can be fully or partially recharged.

However, even small portable charging devices must be carried by the user and must be recharged periodically. There is therefore a need for a small portable charging device that can be carried by the user at all times and can also be recharged without the need to plug into a 120 Volt power supply or a bulky solar panel. To this end, the incorporation of a charging circuit and battery contained within the housing of a wrist watch and the incorporation of a fold out flexible solar panel stored within the wrist band portion of the wrist watch provides a unique solution to the above-mentioned problem.

BRIEF SUMMARY OF THE INVENTION

The primary object of the invention is to provide a portable charging device that is built into a watch body.

Another object of the invention is to provide a portable charging device that includes flexible solar panels built into the underside of a watch band.

Another object of the invention is to provide a portable charging device that can be recharged by the attached fold out solar panel or by external charging devices.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a portable charging device built into watch and watch band comprising: a watch face and associated time telling assembly, a watch housing, a watch back plate, a watch band, a charging cable, a flexible solar panel, a plurality of electronic components forming a charging assembly including a rechargeable battery, a charging circuit, a micro USB port and an on-off switch, said electronic components contained within said watch housing, said watch face and associated time telling assembly located above said electronic components and within said watch housing, said watch housing sides including a horizontally disposed channel for removably retaining said charging cable, said watch back plate forming a bottom panel for said watch housing, said watch housing including left and right side apertures for retaining the hinge pins of said watch band, said flexible solar panel being foldable and capable of being stored under said watch band and said watch housing, said flexible solar panel attached via electrical cable to said rechargeable battery, said micro USB port allowing said charging circuit and battery to be charged by an external charging device, said on off switch capable of turning on and off said charging circuit, said entire charging assembly capable of recharging a smart phone or other rechargeable device by supplying electricity from said rechargeable battery via said charging cable, and said entire charging assembly capable of being recharged by deployment of said flexible solar panel.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS AND PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
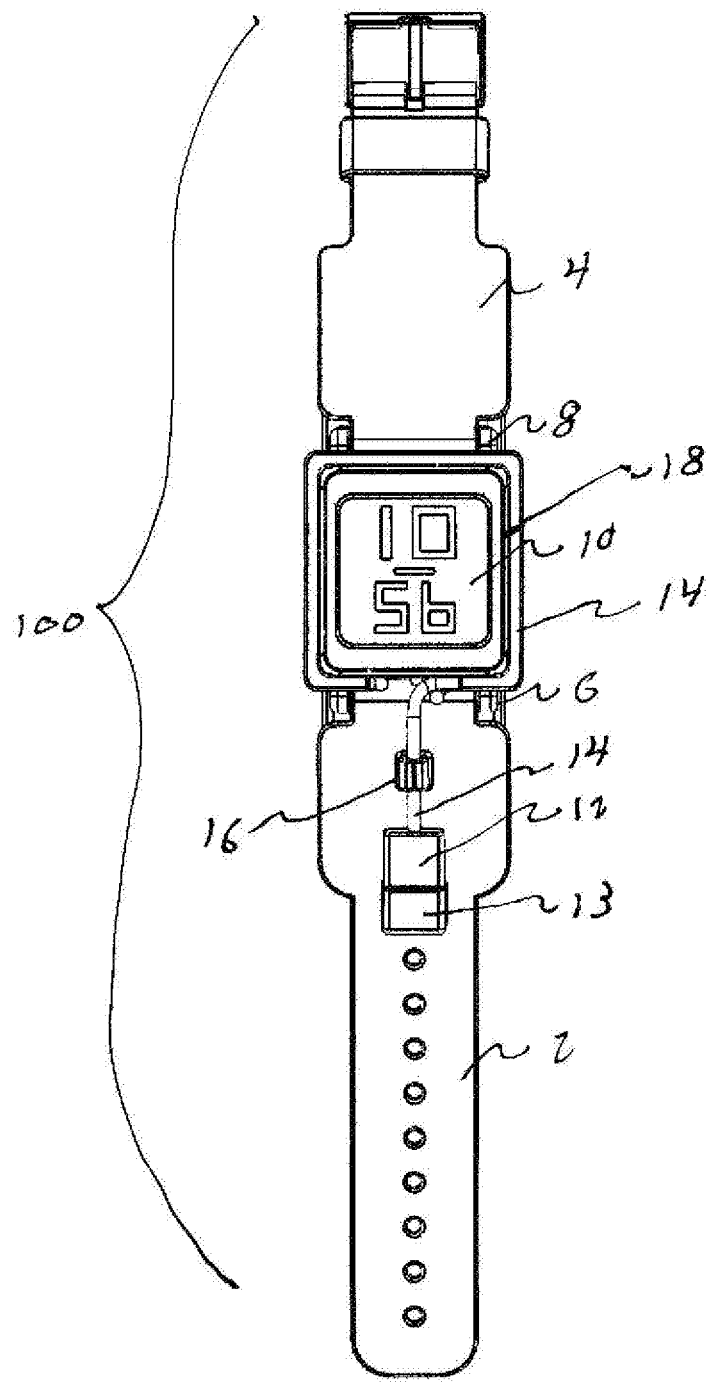
FIG. 1 is a top plan view of the invention.

Referring now to FIG. 1 we see a top plan view of the invention 100. A left and right wrist band 2, 4 attaches in a standard way via hinges 6, 8 to a watch body 18 that includes a watch face 10 and associated watch components. The watch 10 can be an analogue type—either fully mechanical or electro-mechanical, a digital type or a WIFI enabled digital type. A cable 14 wraps around the watch housing 18 and terminates at micro USB jack 12 which is removably retained in jack holding pocket 13 which is molded into the watch band portion 2. The cord 14 enters the watch housing and connects to a charging circuit as will be described when discussing FIG. 6.

Figure 2:
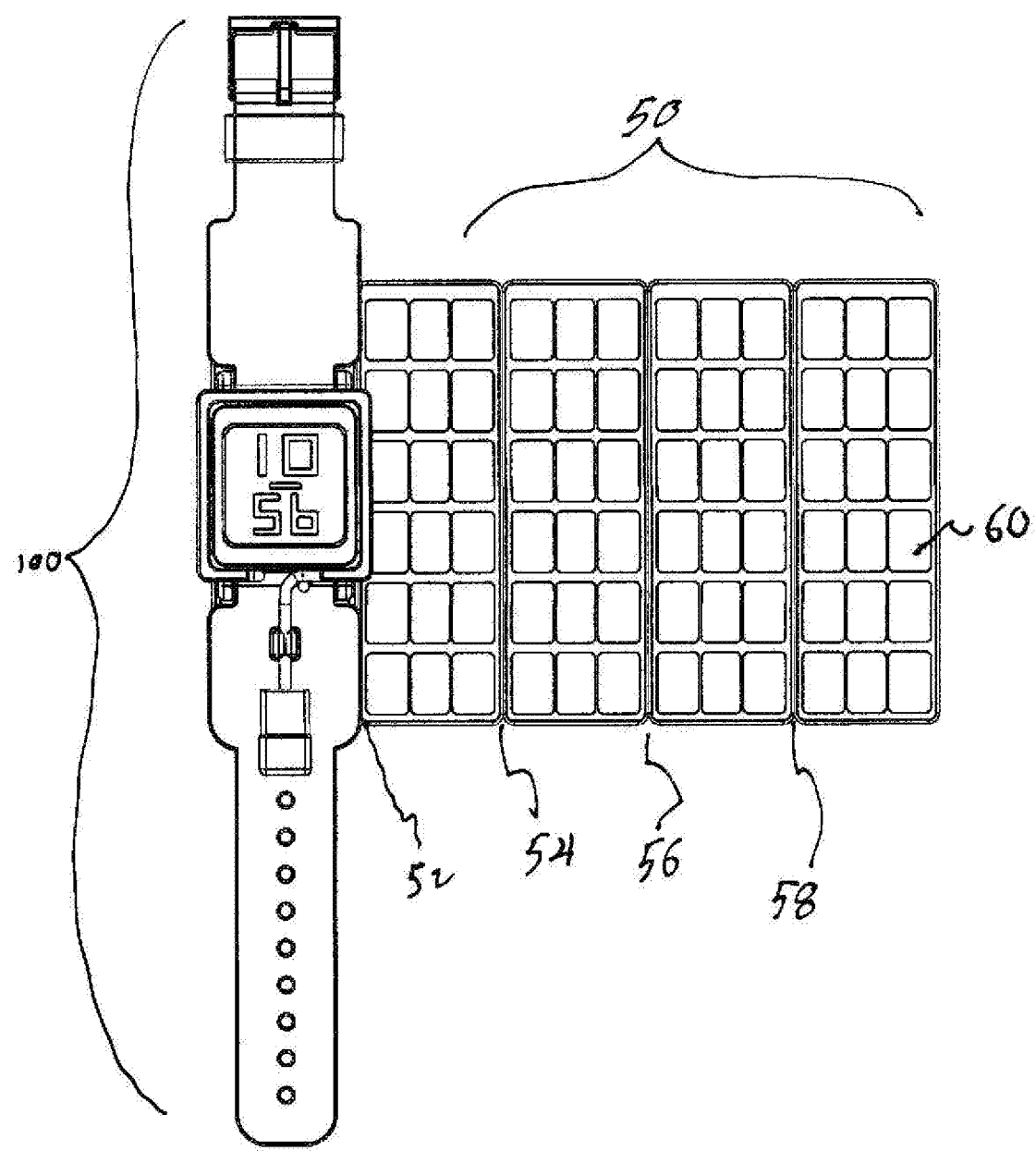
FIG. 2 is a top plan view of the invention with the solar panel extended.

FIG. 2 is a top plan view of the invention 100 with a flexible solar panel 50 in its extended position. The panel 50 is made of a plurality of rectangular panels 60 longitudinally connected to each other via living hinges 52, 54, 56, 58. This enables the solar panel 50 to reside under the watch housing 18 and watch band 2, 4 as shown in FIGS. 3 and 4.

Figure 3:
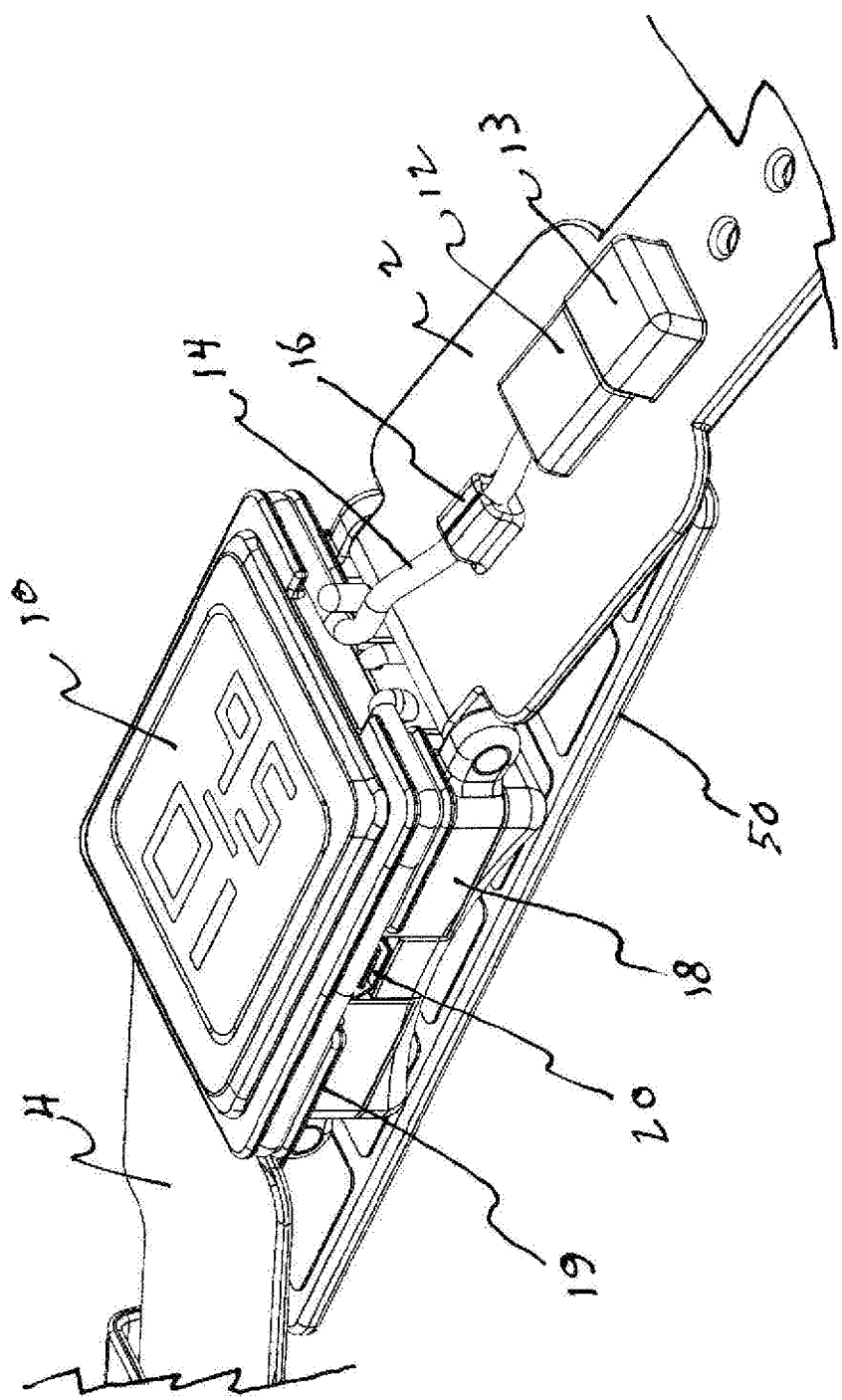
FIG. 3 is a partial perspective view of the invention showing the charging port, cable and cable track.

FIG. 3 is a partial perspective view showing the left side of the watch housing 18. A charging port 20 can be seen and is used for charging the battery 26 within the housing 18 when the user has access to a charging station and does not want to use the solar panel 50 for charging the battery 26. The charging cord 14 is retained in a horizontally disposed track 19 that is located on the side walls of the watch housing 18. This configuration allows the cable to be long enough to charge a smart phone while the smart phone is in use without the need to remove the watch and watchband from the user's wrist.

Figure 4:
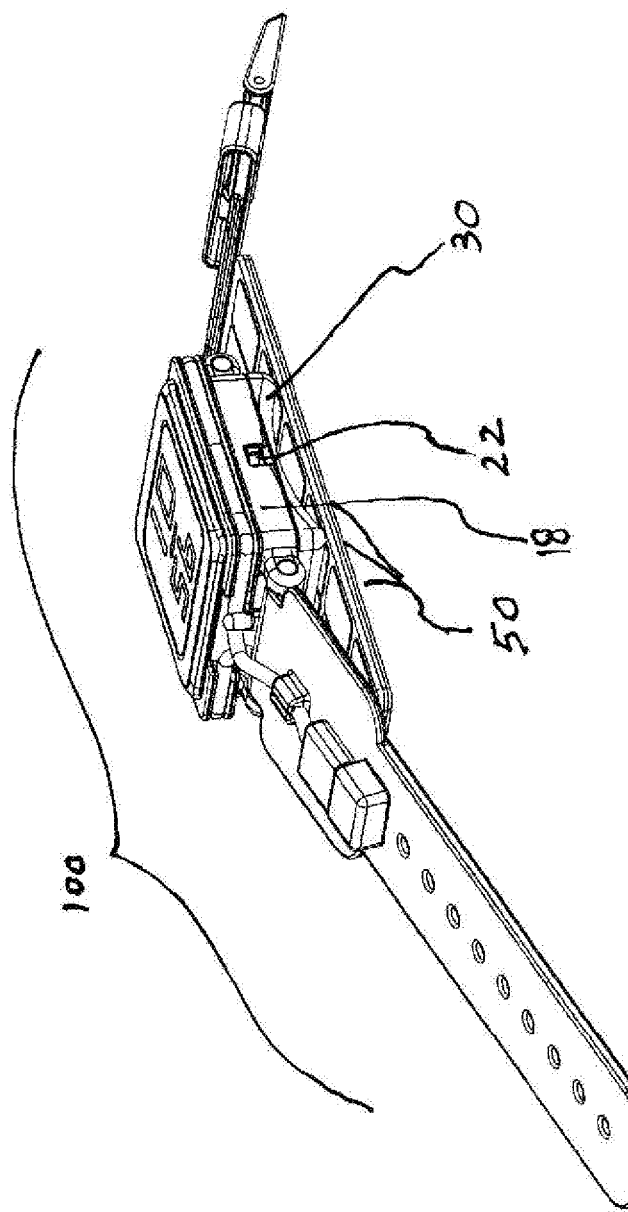
FIG. 4 is a perspective view of the invention showing the folded solar panel located under the watch housing.

FIG. 4 is perspective view of the invention 100 showing the left side of the watch housing 18. An on-off switch 22 can be seen which is turned on by the user to initiate the charging function contained within watch housing 18. The folded solar panel 50 can be clearly seen below the watch housing 18. The panel 50 is flexible, enabling it to conform to the curved surface of the wearer's wrist. The panel 50 is only twenty-five thousandths of an inch thick and flexible, so the folded panel can fit between the underside of the watch band 2,4 and the top side of the user's wrist without difficulty. Housing bottom panel 30 can also be seen an includes a concave surface to match the curve of the wearer's wrist.

Figure 5:
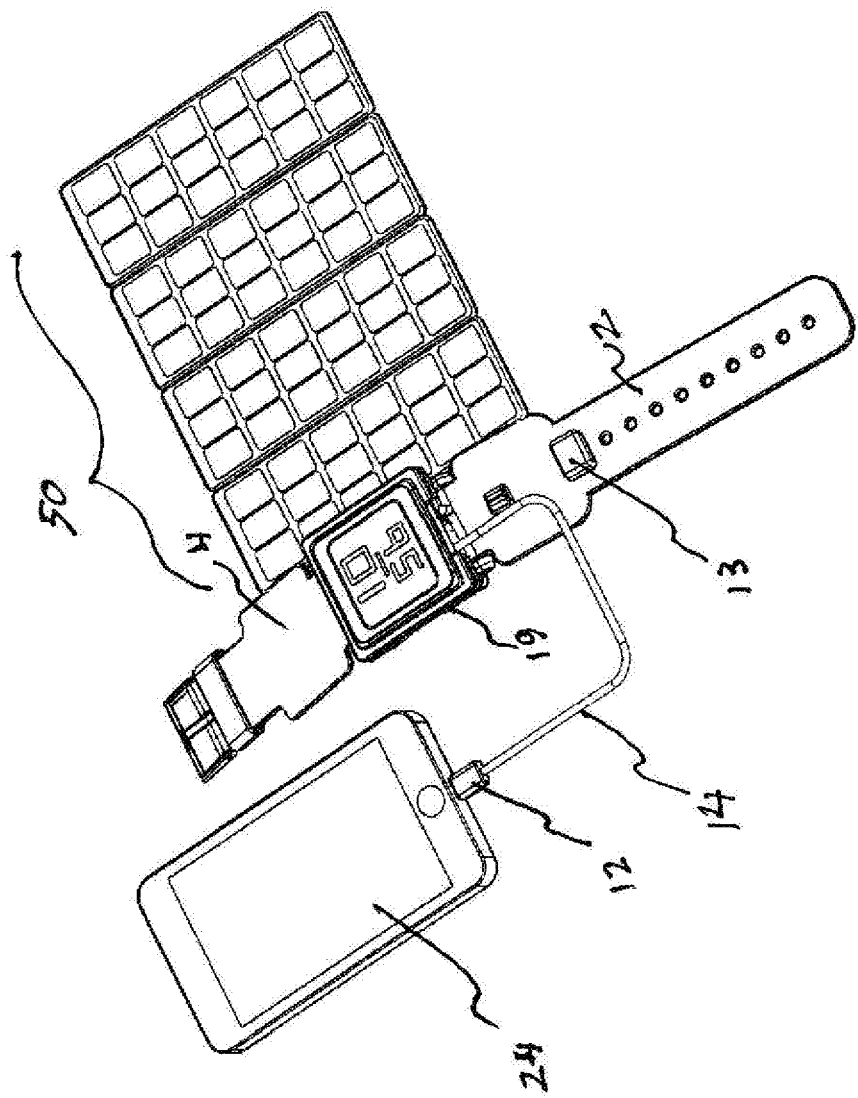
FIG. 5 is a perspective view of the invention showing a smart phone being charged.

FIG. 5 is a perspective view of the invention being used to charge a smart phone 24. Cable 14 has been unwound from the channel 19 that surrounds the watch housing 18. This length of approximately eight inches allows the user to charge his or her phone without needing to remove the watch band from his or her wrist.

Figure 6:
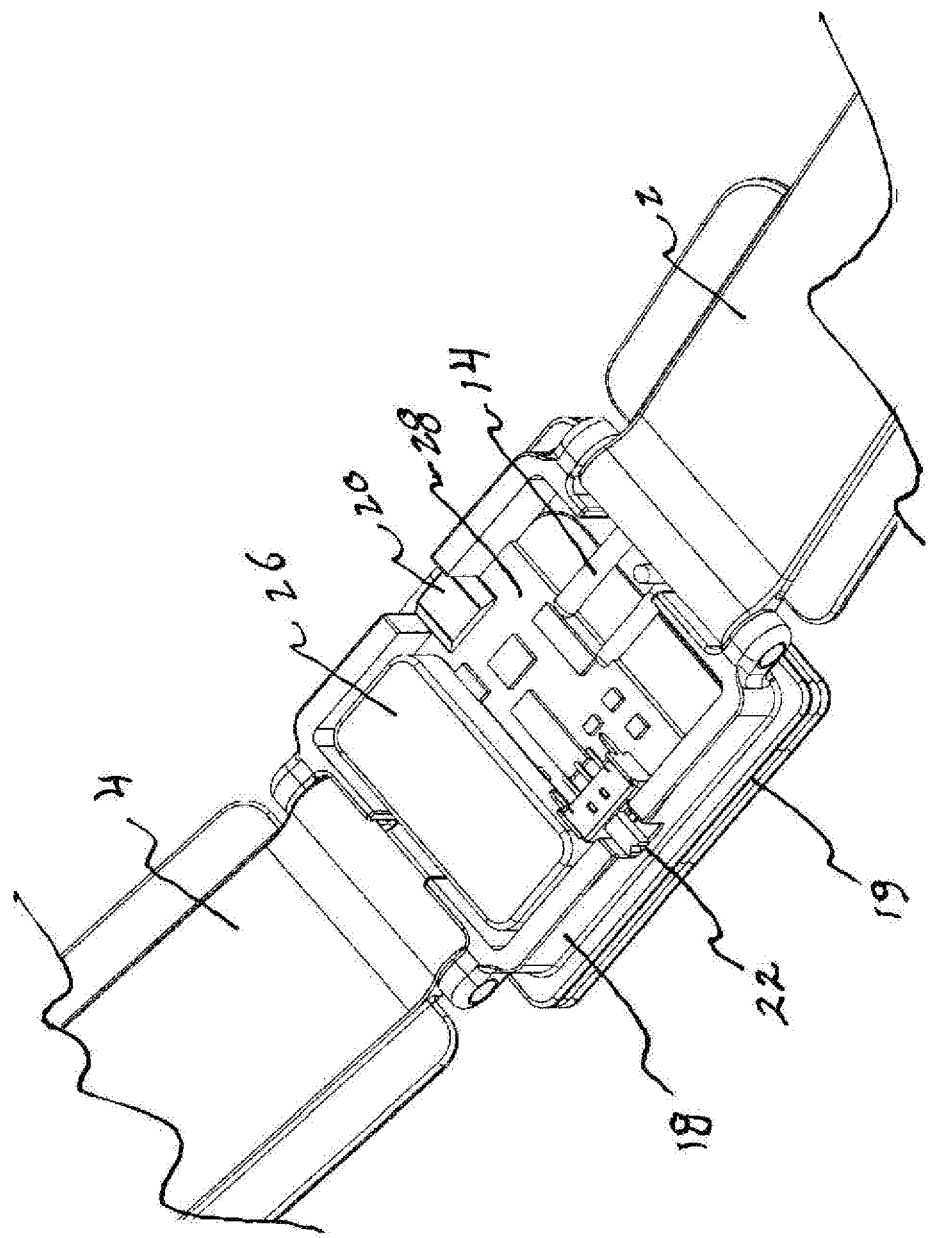
FIG. 6 is a partial perspective view of the inside of the watch body.

FIG. 6 is a partial perspective view of the interior of watch housing 18 with the rear panel 30 removed and the watch portion 10 of the invention removed. A rechargeable battery 26 is attached to a charging circuit 28. The battery 26 can either be charged by the solar panel 50 or by plugging in to a standard charging station via mini USB port 20. Power from the battery 26 is sent via cable 14 to a mini USB jack 12 which can be used to recharge any electronic device such as a smart phone or MP3 player.

The final result of the above described invention is to have a battery charging device available at all times because it is contained within a watch and watch band that are normally worn all day. The fold out solar panel 50 allows the user to charge the battery charging device during daylight hours without the need to plug it into other potentially non-available charging stations.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A portable charging device built into watch band comprising:
   a watch face and associated time telling assembly;
   a watch housing;
   a watch back plate;
   a watch band;
   a charging cable;
   a flexible solar panel;
   a plurality of electronic components forming a charging assembly including a rechargeable battery, a charging circuit, a micro USB port and an on-off switch;
   said electronic components contained within said watch housing;
   said watch face and associated time telling assembly located above said electronic components and within said watch housing;
   said watch housing sides including a horizontally disposed channel for removably retaining said charging cable;
   said watch back plate forming a bottom panel for said watch housing;
   said watch housing including left and right-side apertures for retaining the hinge pins of said watch band;
   said flexible solar panel being foldable and capable of being stored under said watch band and said watch housing;
   said flexible solar panel attached via electrical cable to said rechargeable battery;
   said micro USB port allowing said charging circuit and battery to be charged by an external charging device;
   said on off switch capable of turning on and off said charging circuit;
   said entire charging assembly capable of recharging a smart phone or other rechargeable device by supplying electricity from said rechargeable battery via said charging cable; and
   said entire charging assembly capable of being recharged by deployment of said flexible solar panel.

2. A portable charging device built into watch band as claimed in claim 1 wherein said charging cable is approximately eight inches long thereby allowing a smart phone to be charged without removing said watch band from a user's wrist.

3. A portable charging device built into watch band as claimed in claim 1 wherein said watch face and associated time telling assembly can be an analogue mechanical watch, a digital watch or a WIFI enabled digital watch.

4. A portable charging device built into watch band as claimed in claim 1 wherein the tip of said charging cable is removably retained in a molded in pocket located on the surface of said watch band.

* * * * *